US006304863B1

(12) United States Patent
Murai

(10) Patent No.: US 6,304,863 B1
(45) Date of Patent: Oct. 16, 2001

(54) DATA CONVERTING APPARATUS AND COEFFICIENT DETERMINING APPARATUS FOR USE THEREWITH

(75) Inventor: Kazumasa Murai, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 08/965,528

(22) Filed: Nov. 6, 1997

(30) Foreign Application Priority Data

Nov. 7, 1996 (JP) .................................................. 8-295278

(51) Int. Cl.$^7$ ........................................................ G06N 3/02
(52) U.S. Cl. ................................ 706/15; 706/16; 356/406
(58) Field of Search .......................... 706/15, 16; 356/406

(56) References Cited

U.S. PATENT DOCUMENTS 5,459,817  10/1995  Shima .
5,717,605 * 2/1998  Komiya et al. ....................... 356/406

OTHER PUBLICATIONS

Hassoun, Fundamentals of Artificial Neural Networks, The MIT Press, Mar. 27, 1995.*
Thede, L.D. et al., A comparison of methods for the optimization of VGA colormaps, System Theory, 1993. Proceedings SSST '93., Twenty–Fifth Southeastern Symposium on, Mar. 1993, pp. 508–512.*

Chang, Po–Rong et al., Constrained nonlinear optimization approaches to color–signal separation, Image Processing, IEEE Transactions on, vol.: 4 1, Jan. 1995, pp. 81–94.*
Rai, Sudhendu, System identification and machine setup of color xerographic machines using multivariate modeling and multiobjective optimization Control Applications, 1998. Proceedings of the 1998 IEEE International Conference on, vol.: 2, 1988, p. 72, Mar. 1995.*

* cited by examiner

Primary Examiner—Mark R. Powell
Assistant Examiner—Wilbert Starks, Jr.
(74) Attorney, Agent, or Firm—Oliff & Berridge, PLC.

(57) ABSTRACT

An input data group is converted into an output data group in accordance with coefficients. For each coefficient, a current coefficient value, a coefficient value greater than the current coefficient value and a coefficient value smaller than the current coefficient value may be computed. One of the current, greater and smaller coefficient values is selected on the basis of errors between the output data computed with the current, greater and smaller coefficient values and an ideal output data group corresponding to the input data group.

37 Claims, 6 Drawing Sheets

```
11)  INPUT

12)  DATA CONVERTING APPARATUS

13)  OUTPUT

14)  IDEAL OUTPUT

15)  ERROR

16)  HISTORY OF ERRORS

17)  RANDOM NUMBER DISTRIBUTION CONTROL

18)  STEP CONTROL

A)   COEFFICIENT

B)   ERROR

C)   ERROR + RANDOM NUMBER

D)   SELECTION

E)   UPDATING
```

FIG. 1

11) INPUT

12) DATA CONVERTING APPARATUS

13) OUTPUT

14) IDEAL OUTPUT

15) ERROR

16) HISTORY OF ERRORS

17) RANDOM NUMBER DISTRIBUTION CONTROL

18) STEP CONTROL

A) COEFFICIENT

B) ERROR

C) ERROR + RANDOM NUMBER

D) SELECTION

E) UPDATING

FIG. 2

11) INPUT

12) DATA CONVERTING APPARATUS // OUTPUT = INPUT x $w_1$ + $w_2$

13) OUTPUT

14) IDEAL OUTPUT

15) ERROR

16) HISTORY OF ERRORS

17) RANDOM NUMBER DISTRIBUTION CONTROL

18) STEP CONTROL

A) COEFFICIENT

B) ERROR

C) ERROR + RANDOM NUMBER

D) SELECTION

FIG. 3

11) INPUT

21) COLOR CONVERTING APPARATUS USING NEURAL NETWORK

13) OUTPUT

22) COLOR DIFFERENCE

14) IDEAL OUTPUT

23) COLOR DIFFERENCE SQUARE MEAN

16) HISTORY OF ERRORS

17) RANDOM NUMBER DISTRIBUTION CONTROL

18) STEP CONTROL

A) WEIGHT

B) ERROR

C) ERROR + RANDOM NUMBER

D) SELECTION

E) UPDATING

FIG. 4

11) INPUT

A) COORDINATES AT SUFFICIENTLY FINE INTERVALS ON EACH AXIS

31) COLOR CONVERTING APPARATUS USING TABLE AND INTERPOLATION

13) OUTPUT

32) PRINT

33) COLORIMETRIC VALUE

22) COLOR DIFFERENCE

14) INPUT

34) MEAN COLOR DIFFERENCE

16) HISTORY OF ERRORS

17) RANDOM NUMBER DISTRIBUTION CONTROL

18) STEP CONTROL

B) LATTICE POINT VALUE

C) ERROR

D) ERROR + RANDOM NUMBER

E) SELECTION

F) UPDATING

FIG. 5

11) INPUT

21) COLOR CONVERTING APPARATUS USING NEURAL NETWORK

13) OUTPUT

22) COLOR DIFFERENCE

14) IDEAL OUTPUT

23) COLOR DIFFERENCE SQUARE MEAN

16) HISTORY OF ERRORS

17) RANDOM NUMBER DISTRIBUTION CONTROL

18) STEP CONTROL

42) DIFFERENTIAL COEFFICIENT $E'_p$ for $E_0$

A) ERROR

FIG. 6

100) ELECTRONIC APPARATUS

110) DATA CONVERSION

111) COEFFICIENT OPTIMIZATION

FIG. 7

230) INPUT 210, 220) COLOR CONVERSION

240) OUTPUT

FIG. 8

32) POSITION INPUT

300) ROBOT

310) COEFFICIENT OPTIMIZATION

330) ERROR DETECTION

DATA CONVERTING APPARATUS AND COEFFICIENT DETERMINING APPARATUS FOR USE THEREWITH

BACKGROUND OF THE INVENTION

1. Field of the Invention

The present invention relates to a data converting apparatus defined by an appropriate number of discrete value coefficients and, more specifically, to a method and an apparatus for determining coefficients which, in response to given input data, permit an output with a minimum of errors relative to ideal output data. The invention applies illustratively to techniques for determining coefficients of a color converting apparatus on a hierarchical neural network having discrete value coefficients as well as for determining representative points for color conversion by use of a representative point table and interpolation.

2. Description of the Related Art

For a data converting apparatus defined by a given number of discrete value coefficients, the variety of values each coefficient may take is limited if the tolerable range of coefficients is limited. Thus if all combinations of coefficients are evaluated for error, at least one optimal coefficient exists among them. This technique of searching through all spaces of coefficients yields optimal coefficients unfailingly. Generally, however, the possible combinations of coefficients are so numerous that it is not realistic to search through their spaces for coefficient calculation. It is thus common practice to compute coefficients by use of deductive methods or various approximating methods based on the characteristics of each specific data converting apparatus.

For some data converting apparatuses containing discrete value coefficients, optimal coefficients may be determined in response to a given input/output correspondence. In such cases, conventional deductive methods may be used to determine the coefficients with no problem.

In other cases, coefficients may be determined deductively but do not take discrete values. For example, a data converting apparatus for calculating determinants made of discrete value coefficients is capable of deductively computing each coefficient having a minimum error but yields a result other than a discrete value for each coefficient. Fractions of such results must be rounded to the nearest whole number, counted as a whole number, or disregarded. The rounding operation turns each coefficient into a value different from an optimum value, which leads to worsening errors.

Similar rounding operations also apply to determinants of which the effective precision is limited, e.g., where fixed-point product-sum operations with finite accuracy are carried out. The data converting apparatus performing the operations is subject to a further decline in precision because of the rounding carried out during the calculating process. Such arrangements would require taking into consideration the characteristics of the rounding operation in the computing process in order to obtain optimal coefficients. However, such consideration has yet to be taken up conventionally because of very complicated relations that exist between coefficients and errors. So far, precision has been boosted by establishing finer steps of effective accuracy and of coefficients in the calculating process.

In a data converting apparatus using a representative point table and interpolation, converted data are recorded beforehand to those lattice points in the table which are composed of representative points of each input dimension. The recorded data are interpolated so as to yield a result of the conversion. For that data converting apparatus, the coefficients written in the table are generally constituted by data in effect following the conversion of representative points. Although errors generally result from interpolation, there has been no conventional technique for optimizing the coefficients recorded in the lattice points while concurrently taking into account conversion errors of inputs made through other than lattice points. Conventionally, the level of precision has been enhanced by increasing the number of representative points in the input dimensions.

There exist data converting apparatuses of which the coefficients are continuous and which partially differentiate errors using each coefficient. Such apparatuses are run under a known scheme which determines coefficients through successive approximation of differential equations. On neural networks, in particular, coefficient calculating methods represented by the back propagation method are generally used.

Where discrete value coefficients are involved, errors cannot be partially differentiated by such coefficients. That is, the above methods represented by the back propagation method cannot be utilized.

The difficulty above has been bypassed conventionally, as long as the data converting apparatus in question has the same structure as outlined above and is capable of partial differentiation, by a method whereby coefficients are calculated in advance using continuous values and the results are rounded so as to acquire discrete value coefficients. This method, as with the above-mentioned setup using determinants, is also plagued by the worsening precision attributable to rounding operations.

Learning by hardware has conventionally been based on techniques similar to back propagation wherein like differential equations are approximated with finite accuracy. Such techniques have the disadvantage of the learning process getting halted when the error of back propagation drops below the calculated level of precision.

Neural networks based on fixed-point arithmetic of finite accuracy, as with fixed-point determinants, are also affected by the rounding during calculations. Relations between coefficients and errors on such networks become so complicated that it is practically impossible to obtain optimum discrete values. Conventionally, precision has been enhanced usually by establishing finer steps of effective accuracy and of coefficients in the calculating process. To set up the finely stepped accuracy levels and coefficients involves complicating the structure of the data converting apparatus in question.

The method above concerning neural networks requires that differential equations be solved through successive approximation. The requirement further complicates the structure of the apparatus based on that method.

As far as neural networks are concerned, Japanese Published Patent Application No. Hei 4-282476 (corresponding to U.S. Pat. No. 5,459,817) discloses a learning method of a relatively simple structure. The disclosed method allows update differences of coefficients to be randomly generated so that the coefficients are each updated by alternatively selecting the old or the updated value thereof. The method requires providing a feature for generating random numbers for each synapse. Because only signs are controlled using random numbers with no control exerted on the update quantities, no control is effected on the update quantities from the earliest stage of learning up to an advanced stage of successive learning. This poses two problems: the progress of learning tends to be slow, and the result can be minimally converged if the alternative selection procedure is not structured appropriately.

Of the above-mentioned methods, all except the one involving searching through all spaces of coefficients differ in the way coefficients are computed in accordance with the structure of the data converting apparatus in question. If any one of such methods is adopted as the basis for constituting a data converting apparatus, the structure of that apparatus becomes complicated. As mentioned earlier, the apparatus based on the method for searching through all spaces of coefficients is simply structured but not practical because it needs to search through huge spaces.

Where it is desired to improve the level of accuracy for a conventional data converting apparatus, the structure of the apparatus and that of the method for use therewith need to be changed.

Where coefficients are to be updated on the basis of differential coefficients, it is mandatory to devise suitable differential equations. For such cases as canceling which cannot be dealt with by differentiation, differential equations cannot be devised and thus coefficients cannot be determined.

SUMMARY OF THE INVENTION

It is therefore a general object of the present invention to provide a data converting apparatus and a coefficient determining apparatus for use therewith whereby, with coefficients themselves and the rounding operation in calculations taken into consideration, coefficients are computed with small errors over a time shorter than that of the method for searching through all spaces of coefficients and independently of the structure of any specific data converting apparatus.

It is a more specific object of the invention to provide a data converting apparatus and a coefficient determining apparatus for use therewith for computing coefficients with small errors through iteration of error computations and of the statistical selection of coefficients dependent on the computed errors for error reduction purposes.

In carrying out the invention and according to a first aspect thereof, there is provided a coefficient determining apparatus for use with a data converting apparatus for converting m-dimensional input data into n-dimensional output data in accordance with k coefficients including at least one coefficient taking a discrete value, the coefficient determining apparatus comprising: computing means for computing, for each of at least that one coefficient taking a discrete value, an output data group with respect to a given input data group regarding at least two coefficient values from among a current coefficient value of the coefficient in question, a coefficient value greater than the current coefficient value by a predetermined step s1, and a coefficient value smaller than the current coefficient value by a predetermined step s2; and coefficient value selecting means for selecting one of at least those two coefficient values as a new coefficient value on the basis of a probability which becomes higher the smaller is an error between the output data group computed regarding at least those two coefficient values on the one hand and an ideal output data group corresponding to the given input data group on the other hand.

The coefficient determining apparatus of the above constitution computes an error for each candidate coefficient value. The smaller the error, the higher the probability of the candidate coefficient value in question being regarded as a new coefficient value. Thus repeatedly updating coefficient values provides coefficient value optimization.

In a preferred structure according to the invention, the coefficient value selecting means may include selecting means for adding random numbers of a predetermined distribution to errors of at least those two coefficient values, the selecting means further selecting a coefficient value yielding a minimum sum of the addition.

In another preferred structure according to the invention, the coefficient determining apparatus may further comprise control means for controlling the degree of degression of the probability regarding the magnitude of the error, or the steps s1 and s2, or both the degree of degression and the steps s1 and s2, in accordance with a history of the error.

In a further preferred structure according to the invention, the control means for controlling the degree of degression of the probability regarding the magnitude of the error in accordance with the history of the error may be implemented as means for controlling the predetermined distribution.

In an even further preferred structure of the invention, at least the one coefficient taking a discrete value may correspond to outputs of representative points from a data converting apparatus which, at each of representative points in an m-dimensional representative point table corresponding to m-dimensional input data, may record beforehand discrete values corresponding to n outputs and which may obtain n-dimensional outputs by interpolating the values corresponding to the outputs, the coefficient determining apparatus further comprising coefficient updating means for updating coefficients by defining errors and an ideal output value group for a given input value group.

According to a second aspect of the invention, there is provided a data converting apparatus comprising: data converting means for converting m-dimensional input data into n-dimensional output data in accordance with k coefficients including at least one coefficient taking a discrete value; computing means for computing, for each of at least the one coefficient taking a discrete value, an output data group with respect to a given input data group regarding at least two coefficient values from among a current coefficient value of the coefficient in question, a coefficient value greater than the current coefficient value by a predetermined step s1, and a coefficient value smaller than the current coefficient value by a predetermined step s2; and coefficient value selecting means for selecting one of at least the two coefficient values as a new coefficient value on the basis of a probability which becomes higher the smaller is an error between the output data group computed regarding at least the two coefficient values on the one hand and an ideal output data group corresponding to the given input data group on the other hand.

The data converting apparatus of the preceding constitution also computes an error for each candidate coefficient value. Thus repeatedly updating coefficient values provides coefficient value optimization.

According to a third aspect of the invention, there is provided a color converting apparatus comprising: color converting means for converting m-dimensional first color data into n-dimensional second color data in accordance with k coefficients including at least one coefficient taking a discrete value; computing means for computing, for each of at least the one coefficient taking a discrete value, a second color data group with respect to a given first color data group regarding at least two coefficient values from among a current coefficient value of the coefficient in question, a coefficient value greater than the current coefficient value by a predetermined step s1, and a coefficient value smaller than the current coefficient value by a predetermined step s2; and coefficient value selecting means for selecting one of at least the two coefficient values as a new coefficient value on the basis of a probability which becomes higher the smaller is an error between the second color data group computed regarding at least the two coefficient values on the one hand and an ideal second color data group corresponding to the given first color data group on the other hand.

The color converting apparatus of the preceding constitution computes an error for each candidate coefficient value. The smaller the error, the higher the probability of the candidate coefficient value in question being regarded as anew coefficient value. Thus repeatedly updating coefficient values provides coefficient value optimization.

In a preferred structure according to the invention, the error may be constituted by a color difference.

According to a fourth aspect of the invention, there is provided a color image forming apparatus such as a color copier or a color printer comprising: receiving means for receiving m-dimensional first color data; color converting means for converting the m-dimensional first color data into n-dimensional second color data in accordance with k coefficients including at least one coefficient taking a discrete value; output means for performing a predetermined output operation based on the second color data coming from the color converting means; computing means for computing, for each of at least the one coefficient taking a discrete value, a second color data group with respect to a given first color data group regarding at least two coefficient values from among a current coefficient value of the coefficient in question, a coefficient value greater than the current coefficient value by a predetermined step s1, and a coefficient value smaller than the current coefficient value by a predetermined step s2; and coefficient value selecting means for selecting one of at least the two coefficient values as a new coefficient value on the basis of a probability which becomes higher the smaller is an error between the second color data group computed regarding at least the two coefficient values on the one hand and an ideal second color data group corresponding to the given first color data group on the other hand.

The color image forming apparatus of the preceding constitution also computes an error for each candidate coefficient value. The smaller the error, the higher the probability of the candidate coefficient value in question being regarded as a new coefficient value. Thus repeatedly updating coefficient values provides coefficient value optimization.

In a preferred structure according to the invention, the output means may receive the second color data through color converting means located downstream.

According to a fifth aspect of the invention, there is provided an electronic apparatus comprising: receiving means for receiving m-dimensional input data; data converting means for converting the m-dimensional input data into n-dimensional output data in accordance with k coefficients including at least one coefficient taking a discrete value; output means for performing a predetermined output operation based on the n-dimensional output data coming from the data converting means; computing means for computing, for each of at least the one coefficient taking a discrete value, an output data group with respect to a given input data group regarding at least two coefficient values from among a current coefficient value of the coefficient in question, a coefficient value greater than the current coefficient value by a predetermined step s1, and a coefficient value smaller than the current coefficient value by a predetermined step s2; and coefficient value selecting means for selecting one of at least the two coefficient values as a new coefficient value on the basis of a probability which becomes higher the smaller is an error between the output data group computed regarding at least the two coefficient values on the one hand and an ideal output data group corresponding to the given input data group on the other hand.

The electronic apparatus of the preceding constitution also computes an error for each candidate coefficient value. The smaller the error, the higher the probability of the candidate coefficient value in question being regarded as a new coefficient value. Thus repeatedly updating coefficient values provides coefficient value optimization.

According to a sixth aspect of the invention, there is provided a coefficient determining apparatus for use with a data converting apparatus for converting m-dimensional input data into n-dimensional output data in accordance with k coefficients including at least one coefficient taking a discrete value, the coefficient determining apparatus comprising: output data group computing means for computing, for each of at least the one coefficient taking a discrete value, an output data group regarding p coefficient values within a range including a current coefficient value of the coefficient in question; error computing means for acquiring p errors by computing errors between the output data group computed regarding the p coefficient values on the one hand and an ideal output data group corresponding to the given input data group on the other hand; differential coefficient computing means for assuming, on the basis of the p errors, a function of errors with respect to those of the current coefficient values which may be differentiated, thereby computing differential coefficients for the current coefficient values; and coefficient updating means for updating coefficients either stochastically or definitely on the basis of the differential coefficients.

Here, it is possible to compute p coefficient values by executing predetermined p functions regarding the current coefficient value of the coefficient in question instead of acquiring p coefficient values within the range including the current coefficient value. The function may be arbitrarily determined, and in particular, it is possible to obtain a functional value by adding an appropriate discrete value to the current coefficient value. It may also be possible to multiply an appropriate value by the current coefficient value and round off the product value to the discrete value, thereby acquire the functional value.

The coefficient determining apparatus of the preceding constitution also computes errors for candidate coefficient values, assumes an error function based on the computed errors, and finds differential coefficients for the error function with respect to the current coefficient value. New coefficient values are obtained on the basis of the differential coefficients thus acquired. Repeatedly updating coefficient values provides coefficient value optimization.

In a preferred structure according to the invention, the p coefficient values may include at least one coefficient value from among a current coefficient value of each coefficient, a coefficient value greater than the current coefficient value by a predetermined step s1, and a coefficient value smaller than the current coefficient value by a predetermined step s2.

In another preferred structure according to the invention, the coefficient determining apparatus may further comprise control means for controlling the degree of degression of probability regarding the magnitude of the differential coefficients, or the steps s1 and s2, or both the degree of degression and the steps s1 and s2, in accordance with a history of the errors.

In a further preferred structure according to the invention, at least the one coefficient taking a discrete value may correspond to outputs of representative points from a data converting apparatus which, at each of representative points in an m-dimensional representative point table corresponding to m-dimensional input data, records beforehand discrete values corresponding to n outputs and which obtains n-dimensional outputs by interpolating the values corresponding to the outputs, the coefficient determining apparatus further comprising coefficient updating means for updating coefficients by defining errors and an ideal output value group for a given input value group.

According to a seventh aspect of the invention, there is provided a data converting means comprising: data converting means for converting m-dimensional input data into n-dimensional output data in accordance with k coefficients including at least one coefficient taking a discrete value; output data group computing means for computing, for each of at least the one coefficient taking a discrete value, an output data group regarding p coefficient values within a range including a current coefficient value of the coefficient in question; error computing means for acquiring p errors by computing errors between the output data group computed regarding the p coefficient values on the one hand and an ideal output data group corresponding to the given input data group on the other hand; differential coefficient computing means for assuming, on the basis of the p errors, a function of errors with respect to those of the current coefficient values which may be differentiated, thereby computing differential coefficients for the current coefficient values; and coefficient updating means for updating coefficients either stochastically or definitely on the basis of the differential coefficients.

The data converting apparatus of the preceding constitution also computes errors for candidate coefficient values, assumes an error function based on the computed errors, and finds differential coefficients for the error function with respect to the current coefficient value. New coefficient values are obtained on the basis of the differential coefficients thus acquired. Repeatedly updating coefficient values provides coefficient value optimization.

According to an eighth aspect of the invention, there is provided a color converting apparatus comprising: color converting means for converting m-dimensional first color data into n-dimensional second color data in accordance with k coefficients including at least one coefficient taking a discrete value; second color data group computing means for computing, for each of at least the one coefficient taking a discrete value, a second color data group regarding p coefficient values within a range including a current coefficient value of the coefficient in question; error computing means for acquiring p errors by computing errors between the second color data group computed regarding the p coefficient values on the one hand and an ideal second color data group corresponding to a given first color data group on the other hand; differential coefficient computing means for assuming, on the basis of the p errors, a function of errors with respect to those of the current coefficient values which may be differentiated, thereby computing differential coefficients for the current coefficient values; and coefficient updating means for updating coefficients either stochastically or definitely on the basis of the differential coefficients.

The color converting apparatus of the preceding constitution also computes errors for candidate coefficient values, assumes an error function based on the computed errors, and finds differential coefficients for the error function with respect to the current coefficient value. New coefficient values are obtained on the basis of the differential coefficients thus acquired. Repeatedly updating coefficient values provides coefficient value optimization.

In a preferred structure according to the invention, the errors may be constituted by color differences.

According to a ninth aspect of the invention, there is provided a color image forming apparatus such as a color copier or a color printer comprising: receiving means for receiving m-dimensional first color data; color converting means for converting the m-dimensional first color data into n-dimensional second color data in accordance with k coefficients including at least one coefficient taking a discrete value; output means for performing a predetermined output operation based on the second color data coming from the color converting means; second color data group computing means for computing, for each of at least the one coefficient taking a discrete value, a second color data group regarding p coefficient values within a range including a current coefficient value of the coefficient in question; error computing means for acquiring p errors by computing errors between the second color data group computed regarding the p coefficient values on the one hand and an ideal second color data group corresponding to a given first color data group on the other hand; differential coefficient computing means for assuming, on the basis of the p errors, a function of errors with respect to those of the current coefficient values which may be differentiated, thereby computing differential coefficients for the current coefficient values; and coefficient updating means for updating coefficients either stochastically or definitely on the basis of the differential coefficients.

The color image forming apparatus of the preceding constitution also computes errors for candidate coefficient values, assumes an error function based on the computed errors, and finds differential coefficients for the error function with respect to the current coefficient value. New coefficient values are obtained on the basis of the differential coefficients thus acquired. Repeatedly updating coefficient values provides coefficient value optimization.

In a preferred structure according to the invention, the output means may receive the second color data through color converting means located downstream.

According to a tenth aspect of the invention, there is provided an electronic apparatus comprising: receiving means for receiving m-dimensional first color data; data converting means for converting the m-dimensional input data into n-dimensional output data in accordance with k coefficients including at least one coefficient taking a discrete value; output means for performing a predetermined output operation based on the n-dimensional output data coming from the data converting means; output data group computing means for computing, for each of at least the one coefficient taking a discrete value, an output data group regarding p coefficient values within a range including a current coefficient value of the coefficient in question; error computing means for acquiring p errors by computing errors between the output data group computed regarding the p coefficient values on the one hand and an ideal output data group corresponding to a given input data group on the other hand; differential coefficient computing means for assuming, on the basis of the p errors, a function of errors with respect to those of the current coefficient values which may be differentiated, thereby computing differential coefficients for the current coefficient values; and coefficient updating means for updating coefficients either stochastically or definitely on the basis of the differential coefficients.

The electronic apparatus of the preceding constitution also computes errors for candidate coefficient values, assumes an error function based on the computed errors, and finds differential coefficients for the error function with respect to the current coefficient value. New coefficient values are obtained on the basis of the differential coefficients thus acquired. Repeatedly updating coefficient values provides coefficient value optimization.

According to an eleventh aspect of the invention, there is provided a coefficient determining apparatus for use with a neural network having k coefficients including at least one coefficient taking a discrete incidence number, or a discrete threshold value, or both a discrete incidence number and a discrete threshold value, the coefficient determining apparatus comprising: computing means for computing, for each of at least the one coefficient taking a discrete value, an output data group with respect to a given input data group regarding at least two coefficient values from among a current coefficient value of the coefficient in question, a coefficient value greater than the current coefficient value by a predetermined step s1, and a coefficient value smaller than the current coefficient value by a predetermined step s2; and coefficient value selecting means for selecting one of at least the two coefficient values as a new coefficient value on the basis of a probability which becomes higher the smaller is an error between the output data group computed regarding at least the two coefficient values on the one hand and an ideal output data group corresponding to the given input data group on the other hand.

The coefficient determining apparatus of the preceding constitution also computes an error for each candidate coefficient value. The smaller the error, the higher the probability of the candidate coefficient value in question being regarded as a new coefficient value. Thus repeatedly updating coefficient values provides coefficient value optimization.

According to a twelfth aspect of the invention, there is provided a data converting apparatus comprising: a neural network having k coefficients including at least one coefficient taking a discrete incidence number, or a discrete threshold value, or both a discrete incidence number and a discrete threshold value; computing means for computing, for each of at least the one coefficient taking a discrete value, an output data group with respect to a given input data group regarding at least two coefficient values from among a current coefficient value of the coefficient in question, a coefficient value greater than the current coefficient value by a predetermined step s1, and a coefficient value smaller than the current coefficient value by a predetermined step s2; and coefficient value selecting means for selecting one of at least the two coefficient values as a new coefficient value on the basis of a probability which becomes higher the smaller is an error between the output data group computed regarding at least the two coefficient values on the one hand and an ideal output data group corresponding to the given input data group on the other hand.

The data converting apparatus of the preceding constitution also computes an error for each candidate coefficient value. The smaller the error, the higher the probability of the candidate coefficient value in question being regarded as a new coefficient value. Thus repeatedly updating coefficient values provides coefficient value optimization.

According to a thirteenth aspect of the invention, there is provided a coefficient determining apparatus for use with a neural network having k coefficients including at least one coefficient taking a discrete incidence number, or a discrete threshold value, or both a discrete incidence number and a discrete threshold value, the coefficient determining apparatus comprising: output data group computing means for computing, for each of at least the one coefficient taking a discrete value, an output data group regarding p coefficient values within a range including a current coefficient value of the coefficient in question; error computing means for acquiring p errors by computing errors between the output data group computed regarding the p coefficient values on the one hand and an ideal output data group corresponding to a given input data group on the other hand; differential coefficient computing means for assuming, on the basis of the p errors, a function of errors with respect to those of the current coefficient values which may be differentiated, thereby computing differential coefficients for the current coefficient values; and coefficient updating means for updating coefficients either stochastically or definitely on the basis of the differential coefficients.

The coefficient determining apparatus of the preceding constitution also computes errors for candidate coefficient values, assumes an error function based on the computed errors, and finds differential coefficients for the error function with respect to the current coefficient value. New coefficient values are obtained on the basis of the differential coefficients thus acquired. Repeatedly updating coefficient values provides coefficient value optimization.

According to a fourteenth aspect of the invention, there are provided a coefficient determining apparatus and a data converting apparatus for use with a neural network, each of the apparatuses comprising: a neural network having k coefficients including at least one coefficient taking a discrete incidence number, or a discrete threshold value, or both a discrete incidence number and a discrete threshold value; output data group computing means for computing, for each of at least the one coefficient taking a discrete value, an output data group regarding p coefficient values within a range including a current coefficient value of the coefficient in question; error computing means for acquiring p errors by computing errors between the output data group computed regarding the p coefficient values on the one hand and an ideal output data group corresponding to a given input data group on the other hand; differential coefficient computing means for assuming, on the basis of the p errors, a function of errors with respect to those of the current coefficient values which may be differentiated, thereby computing differential coefficients for the current coefficient values; and coefficient updating means for updating coefficients either stochastically or definitely on the basis of the differential coefficients.

Each of the coefficient determining apparatus and data converting apparatus of the preceding constitution also computes errors for candidate coefficient values, assumes an error function based on the computed errors, and finds differential coefficients for the error function with respect to the current coefficient value. New coefficient values are obtained on the basis of the differential coefficients thus acquired. Repeatedly updating coefficient values provides coefficient value optimization.

According to a fifteenth aspect of the invention, there is provided a coefficient determining apparatus for use with a data converting apparatus for converting m-dimensional input data into n-dimensional output data in accordance with k coefficients including at least one coefficient taking a discrete value, the coefficient determining apparatus comprising: computing means for computing, for each of at least the one coefficient taking a discrete value, an output data group with respect to a given input data group regarding at least two coefficient values from among a current coefficient value of the coefficient in question, a coefficient value greater than the current coefficient value by a predetermined step s1, and a coefficient value smaller than the current coefficient value by a predetermined step s2; coefficient value selecting means for selecting one of at least the two coefficient values as a new coefficient value on the basis of a probability which becomes higher the smaller is an error between the output data group computed regarding at least the two coefficient values on the one hand and an ideal output data group corresponding to the given input data group on the other hand; output data group computing means for computing, for each of at least the one coefficient taking a discrete value, an output data group regarding p coefficient values within a range including a current coefficient value of the coefficient in question; error computing means for acquiring p errors by computing errors between the output data group computed regarding the p coefficient values on the one hand and an ideal output data group corresponding to the given input data group on the other hand; differential coefficient computing means for assuming, on the basis of the p errors, a function of errors with respect to those of the current coefficient values which may be differentiated, thereby computing differential coefficients for the current coefficient values; and coefficient updating means for updating coefficients either stochastically or definitely on the basis of the differential coefficients; wherein the coefficient value selecting means performs selection of the new coefficient value at least once and then the coefficient updating means carries out updating of coefficients at least once.

The coefficient determining apparatus of the preceding constitution computes an error for each candidate coefficient value. The smaller the error, the higher the probability of the candidate coefficient value in question being regarded as a new coefficient value. Thereafter, the apparatus assumes an error function based on the computed errors, and finds differential coefficients for the error function with respect to the current coefficient value. New coefficient values are obtained on the basis of the differential coefficients thus acquired. Repeatedly updating coefficient values provides coefficient value optimization.

According to a sixteenth aspect of the invention, there is provided a coefficient determining method for causing a data converting apparatus to convert m-dimensional input data into n-dimensional output data in accordance with k coefficients including at least one coefficient taking a discrete value, the coefficient determining method comprising the steps of: computing, for each of at least the one coefficient taking a discrete value, an output data group with respect to a given input data group regarding at least two coefficient values from among a current coefficient value of the coefficient in question, a coefficient value greater than the current coefficient value by a predetermined step s1, and a coefficient value smaller than the current coefficient value by a predetermined step s2; and selecting one of at least the two coefficient values as a new coefficient value on the basis of a probability which becomes higher the smaller is an error between the output data group computed regarding at least the two coefficient values on the one hand and an ideal output data group corresponding to the given input data group on the other hand.

The coefficient determining method of the preceding structure also computes an error for each candidate coefficient value. The smaller the error, the higher the probability of the candidate coefficient value in question being regarded as a new coefficient value. Thus repeatedly updating coefficient values provides coefficient value optimization.

According to a seventeenth aspect of the invention, there is provided a coefficient determining method for causing a data converting apparatus to convert m-dimensional input data into n-dimensional output data in accordance with k coefficients including at least one coefficient taking a discrete value, the coefficient determining method comprising the steps of: computing, for each of at least the one coefficient taking a discrete value, an output data group regarding p coefficient values within a range including a current coefficient value of the coefficient in question; acquiring p errors by computing errors between the output data group computed regarding the p coefficient values on the one hand and an ideal output data group corresponding to a given input data group on the other hand; assuming, on the basis of the p errors, a function of errors with respect to those of the current coefficient values which may be differentiated, thereby computing differential coefficients for the current coefficient values; and updating coefficients either stochastically or definitely on the basis of the differential coefficients.

The coefficient determining method of the preceding structure also computes errors for candidate coefficient values, assumes an error function based on the computed errors, and finds differential coefficients for the error function with respect to the current coefficient value. New coefficient values are obtained on the basis of the differential coefficients thus acquired. Repeatedly updating coefficient values provides coefficient value optimization.

According to an eighteenth aspect of the invention, there is provided a coefficient determining method for causing a data converting apparatus to convert m-dimensional input data into n-dimensional output data in accordance with k coefficients including at least one coefficient taking a discrete value, the coefficient determining method comprising the steps of: computing, for each of at least the one coefficient taking a discrete value, an output data group with respect to a given input data group regarding at least two coefficient values from among a current coefficient value of the coefficient in question, a coefficient value greater than the current coefficient value by a predetermined step s1, and a coefficient value smaller than the current coefficient value by a predetermined step s2; selecting one of at least the two coefficient values as a new coefficient value on the basis of a probability which becomes higher the smaller is an error between the output data group computed regarding at least the two coefficient values on the one hand and an ideal output data group corresponding to the given input data group on the other hand; computing, for each of at least the one coefficient taking a discrete value following the selection of the new coefficient value, an output data group regarding p coefficient values within a range including a current coefficient value of the coefficient in question; acquiring p errors by computing errors between the output data group computed regarding the p coefficient values on the one hand and an ideal output data group corresponding to the given input data group on the other hand; assuming, on the basis of the p errors, a function of errors with respect to those of the current coefficient values which may be differentiated, thereby computing differential coefficients for the current coefficient values; and updating coefficients either stochastically or definitely on the basis of the differential coefficients; wherein the selection of the new coefficient value is performed at least once and then the updating of coefficients is carried out at least once.

The coefficient determining method of the preceding structure computes an error for each candidate coefficient value. The smaller the error, the higher the probability of the candidate coefficient value in question being regarded as a new coefficient value. Thereafter, the inventive method assumes an error function based on the computed errors, and finds differential coefficients for the error function with respect to the current coefficient value. New coefficient values are obtained on the basis of the differential coefficients thus acquired. Repeatedly updating coefficient values provides coefficient value optimization.

According to a nineteenth aspect of the invention, there is provided a coefficient determining method for causing a data converting apparatus to convert m-dimensional input data into n-dimensional output data in accordance with k coefficients including at least one coefficient taking a discrete value, the coefficient determining method comprising the steps of: causing a reference data converting apparatus functionally equivalent to the data converting apparatus to compute, for each of at least the one coefficient taking a discrete value, an output data group with respect to a given input data group regarding at least two coefficient values from among a current coefficient value of the coefficient in question, a coefficient value greater than the current coefficient value by a predetermined step s1, and a coefficient value smaller than the current coefficient value by a predetermined step s2; selecting one of at least the two coefficient values as a new coefficient value on the basis of a probability which becomes higher the smaller is an error between the output data group computed regarding at least the two coefficient values on the one hand and an ideal output data group corresponding to the given input data group on the other hand; and setting the selected coefficient value as a coefficient for use by the data converting apparatus.

The coefficient determining method of the preceding structure also computes an error for each candidate coefficient value. The smaller the error, the higher the probability of the candidate coefficient value in question being regarded as a new coefficient value. Thus repeatedly updating coefficient values provides coefficient value optimization.

According to a twentieth aspect of the invention, there is provided a coefficient determining method for causing a data converting apparatus to convert m-dimensional input data into n-dimensional output data in accordance with k coefficients including at least one coefficient taking a discrete value, the coefficient determining method comprising the steps of: causing a reference data converting apparatus functionally equivalent to the data converting apparatus to compute, for each of at least the one coefficient taking a discrete value, an output data group regarding p coefficient values within a range including a current coefficient value of the coefficient in question; acquiring p errors by computing errors between the output data group computed regarding the p coefficient values on the one hand and an ideal output data group corresponding to a given input data group on the other hand; assuming, on the basis of the p errors, a function of errors with respect to those of the current coefficient values which may be differentiated, thereby computing differential coefficients for the current coefficient values; updating coefficients either stochastically or definitely on the basis of the differential coefficients; and setting the selected coefficient value as a coefficient for use by the data converting apparatus.

The coefficient determining method of the preceding structure also computes errors for candidate coefficient values, assumes an error function based on the computed errors, and finds differential coefficients for the error function with respect to the current coefficient value. New coefficient values are obtained on the basis of the differential coefficients thus acquired. Repeatedly updating coefficient values provides coefficient value optimization.

Other objects and advantages of the invention will become apparent from the examination of the present disclosure.

BRIEF DESCRIPTION OF THE DRAWINGS

FIG. 1 is a view showing a typical constitution of a first embodiment of the present invention;

FIG. 2 is a view depicting the first embodiment in more detail;

FIG. 3 is a view illustrating a typical constitution of a second embodiment of the invention;

FIG. 4 is a view indicating a typical constitution of a third embodiment of the invention;

FIG. 5 is a view sketching a typical constitution of a fourth embodiment of the invention;

FIG. 6 is a view describing a typical application of the invention;

FIG. 7 is a view showing another typical application of the invention; and

FIG. 8 is a view portraying yet another typical application of the invention.

DESCRIPTION OF THE PREFERRED EMBODIMENTS

Preferred embodiments of the present invention will now be described with reference to the accompanying drawings.

First Embodiment

FIG. 1 shows a typical constitution of the first embodiment of the invention including a coefficient optimizing system for use with a data converting apparatus. In FIG. 1, the system comprises an input buffer 11, a data converting apparatus 12, an output buffer 13, an ideal output data memory 14, an error computing part 15, an error history memory 16, a random number distribution controller 17, a step controller 18 and a coefficient updating part 19. The input buffer 11 stores externally supplied m-dimensional input data. The data converting apparatus 12 converts the m-dimensional input data into n-dimensional output data using coefficients each taking a discrete value. The output buffer 13 stores the n-dimensional output data coming from the data converting apparatus 12. The error computing part 15 computes an error between the output data and ideal output data and sends the error to the coefficient updating part 19 and error history memory 16. The random number distribution controller 17 varies the distribution of random numbers in accordance with the history of errors. The step controller 18 varies the amount of steps as increments or decrements also in accordance with the history of errors. The control operations provide simulated annealing. The coefficient updating part 19 takes a coefficient value whose error, when added to a random number, constitutes a minimum value and regards that coefficient value as a new coefficient value.

Coefficient optimization takes place specifically as follows: it is assumed that j sets of m-dimensional input data and the corresponding n-dimensional ideal output data are given. That is, the input data x and the ideal output data y are assumed to be in the relation of $\{x_1, y_1\}, \{x_2, y_2\}, \ldots, \{x_i, y_i\}, \ldots, \{x_j, y_j\}$. It is also assumed that the input data $x_i$ in m-dimensions occur as $$x_i = (x_{i1}, x_{i2}, \ldots, x_{im})$$

and that the ideal output data $y_i$ in n dimensions occur as $$y_i = (y_{i1}, y_{i2}, \ldots, y_{in})$$

As many as k coefficients $(w_1, w_2, \ldots, w_p, \ldots, w_k)$ for the data converting apparatus are initialized in advance using suitable initial values including all zeros or coefficients determined by conventional techniques such as rounding. Given m-dimensional data $x_i$, the data converting apparatus is assumed to output:

$$f(x_i | w_1, w_2, \ldots, w_p, \ldots, w_k)$$

The error with respect to the ideal output $y_i$ is assumed to be:

$$d(y_i, f(x_i | w_1, w_2, \ldots, w_p, \ldots, w_k))$$

where, d stands for a suitable distance in n dimensions such as a Euclidian distance. With the first embodiment, the error of the data converting apparatus is constituted by the sum of errors of all data given by the following expression (1):

$$E(w_1, w_2, \ldots, w_p, \ldots, w_k) = \Sigma_{i=1} \ldots {}_j d(y_i, f(x_i | w_1, w_2, \ldots, w_p, \ldots, w_k))$$

Of the k coefficients, the p-th coefficient $w_p$ is taken up here for example. Three kinds of error are computed: an error $E_0$ about a current coefficient value, i.e., $E_0 = E(w_1, w_2, \ldots, w_p, \ldots, w_k)$; an error $E_+$ regarding a coefficient value greater than the current coefficient value by a predetermined step s, i.e., $E_+ = E(w_1, w_2, \ldots, w_p + s, \ldots w_k)$; and an error $E_-$ with respect to a coefficient value smaller than the current coefficient value by the predetermined step s, i.e., $E_- = E(w_1, w_2, \ldots, w_p - s, \ldots, w_k)$. With the first embodiment, the same step s is used both as an increment to the current value and as a decrement to be subtracted therefrom. Alternatively, the step for addition to the current coefficient value need not be the same as the step for subtraction therefrom.

These errors are each augmented by a random number based on a uniform distribution within a predetermined range of [0, T], thereby bringing about the following set of expressions (2):

$$e_0 = E_0 + N$$

$$e_+ = E_+ + N$$

$$e_- = E_- + N$$

If the error $e_0$ is the smallest of the three errors $e_0$, $e_+$ and $e_-$, the coefficient $w_p$ is not updated. If the error $e_+$ is the smallest, the coefficient $w_p$ is updated by adding the step s thereto. If the error $e_-$ is the smallest, the coefficient $w_p$ is updated by subtracting the step s therefrom.

The above operations are performed on each coefficient $w_p (p=1, 2, \ldots, k)$. When an optimization routine made up of these operations has been carried out once and come to an end, the data converting apparatus is checked for error. The optimization routine is repeated until the detected errors of the apparatus are either lowered below a predetermined level or are substantially converged. Alternatively, the routine is repeated a predetermined number of times. If a minimum error is reached, the corresponding coefficient is recorded as an optimal coefficient. In that case, the value T for determining the above-mentioned range is augmented by having T multiplied by a suitable value grater than 1. If the error is found to be greater than that in effect before the optimization routine is performed once and comes to an end, the value T is decreased by having T multiplied by a suitable value smaller than 1. Similar operations are performed on the step s, except that any value smaller than the step unit will not be taken.

When learning is completed following the above operations, the finally recorded optimal coefficient is output.

Below is a description of how the first embodiment in its simplest structure shown in FIG. 2 is used illustratively to determine coefficients. The structure involves a one-input one-output data converting apparatus that uses the expression (3) below having two integer coefficients $w_1$, and $w_2$:

$$y = x \cdot w_1 + w_2$$

where x represents an input to the data converting apparatus and y denotes an output from the apparatus. It is assumed that as a step, $s_1 = s_2 = 1$ and that the data converting apparatus is fed with an input group and its corresponding ideal output group as shown in Table 1 below:

TABLE 1

| Serial No. | Input | Ideal Output |
|---|---|---|
| 1 | 0 | −1 |
| 2 | 1 | 0 |
| 3 | 2 | 1 |

For the first embodiment with its method of determining coefficients, coefficients $w_1$ and $w_2$ as well as an initial value are all assumed to be 0. In that case, a total Euclidian distance is used as an error. The coefficient $w_1$ is first incremented by that error and then by the error plus a random number of a uniform distribution within a range of [0 . . . 2]. The computed results are shown illustratively in Table 2 below:

TABLE 2

| Serial No. | Input | Ideal Output | $w_1 = -1$ | $w_1 = 0$ | $w_1 = 1$ |
|---|---|---|---|---|---|
| 1 | 0 | −1 | 0 | 0 | 0 |
| 2 | 1 | 0 | −1 | 0 | 1 |
| 3 | 2 | 1 | −2 | 0 | 2 |
| | | Error | 5 | 2 | 3 |
| | | Error + random number | 7.2 | 3.1 | 3.7 |

On the basis of the above results, the coefficient $w_1$ is not updated. The coefficient $w_2$ is also incremented first by the error and then by the error plus a random number of a uniform distribution. The computed results are shown illustratively in Table 3 below:

TABLE 3

| Serial No. | Input | Ideal Output | $w_2 = -1$ | $w_2 = 0$ | $w_2 = 1$ |
|---|---|---|---|---|---|
| 1 | 0 | −1 | −1 | 0 | 1 |
| 2 | 1 | 0 | −1 | 0 | 1 |
| 3 | 2 | 1 | −1 | 0 | 1 |

TABLE 3-continued

| Serial No. | Input | Ideal Output | $w_2 = -1$ | $w_2 = 0$ | $w_2 = 1$ |
|---|---|---|---|---|---|
| | | Error | 3 | 2 | 3 |
| | | Error + random number | 3.5 | 2.1 | 4.5 |

Based on the above results, the coefficient $w_2$ is not updated as well. This is what is known as a minimal error situation in which the error remains minimal as long as no variable is changed. Because the first embodiment has the coefficients incremented by an error each, the computations above are repeated so as to leave behind the minimal error situation with a certain degree of probability.

At that point, the error is evaluated and found to be 2. Since the error is appreciably large, the coefficient $w_1$ is again incremented first by the error and then by the error plus a random number. The computed results are shown illustratively in Table 4 below:

TABLE 4

| Serial No. | Input | Ideal Output | $w_1 = -1$ | $w_1 = 0$ | $w_1 = 1$ |
|---|---|---|---|---|---|
| 1 | 0 | −1 | 0 | 0 | 0 |
| 2 | 1 | 0 | −1 | 0 | 1 |
| 3 | 2 | 1 | −2 | 0 | 2 |
| | | Error | 5 | 2 | 3 |
| | | Error + random number | 5.1 | 3.8 | 3.6 |

Given the above results, the coefficient $w_1$ is updated to take the value of 1. Likewise the coefficient $w_2$ is incremented first by the error and then by the error plus a random number. The computed results are shown illustratively in Table 5 below:

TABLE 5

| Serial No. | Input | Ideal Output | $w_2 = -1$ | $w_2 = 0$ | $w_2 = 1$ |
|---|---|---|---|---|---|
| 1 | 0 | −1 | −1 | 0 | 1 |
| 2 | 1 | 0 | 0 | 1 | 2 |
| 3 | 2 | 1 | 1 | 2 | 3 |
| | | Error | 0 | 3 | 6 |
| | | Error + random number | 1.1 | 3.8 | 7.3 |

On the basis of the results above, the coefficient $w_2$ is updated to take the value of −1. At this point, the error is evaluated and found to be 0. Since the error is sufficiently small, the coefficient optimization is terminated.

As described illustratively above, the first embodiment progressively decreases the error and, by having the coefficients augmented by appropriate random numbers, leaves behind the point of a minimal error with a suitable degree of probability. The process allows coefficients to be acquired with smaller errors than ever.

In the simplified example above, the optimization routine has come to an end after being performed twice. In reality, more complex coefficients generally need to be determined. In such cases, pursuing optimization with large random numbers makes it difficult to converge on final coefficients even after the optimization routine is substantially terminated. This requires making random numbers smaller for promoting convergence so that coefficients with smaller errors will be selected with a higher probability. On the other hand, too small random numbers can make it impossible to leave the minimal error situation behind. Such potential drawbacks are bypassed by the first embodiment utilizing a history of errors for control over probability.

Although the steps $s_1$ and $S_2$ are both assumed to be 1 in the simplified example above, suitable steps are in reality controlled based on the history of errors both for enhancing the processing speed and for leaving behind the minimal error situation with a higher probability. The steps $s_1$ and $S_2$ may be made different so as to realize an optimization routine involving a substantially small step, i.e., the greatest common measure of $s_1$, $s_5$ and $|s_1 - s_2|$.

Whereas the above description of the first embodiment has resorted to plain illustrations, the embodiment operates in like manner when applied to a more complicated data converting apparatus.

The first embodiment evaluates the error of the data converting apparatus by taking rounding operations and the precision of the apparatus into consideration. With such error factors counted in, the first embodiment computes coefficients with smaller errors than ever at higher speeds than setups of total inspection.

Second Embodiment

Below is a description of the second embodiment that performs color conversion using a neural network as a data converting apparatus taking discrete coefficients. FIG. 3 shows a typical constitution of the second embodiment. In FIG. 3, those parts with their counterparts already shown in FIG. 1 are given the same reference numerals and detailed descriptions of such parts are omitted where they are repetitive. In FIG. 3, the input buffer 11 holds print area ratios for cyan (C), magenta (M), yellow (Y) and Indian ink (K) as input data. A color converting apparatus 21 using a neural network converts the area ratios of C, M, Y and K into CIE L*a*b* (D50) color coordinates. Coefficients of the neural network are discrete and are optimized by the coefficient updating part 19. Converted color coordinate data are placed in the output buffer 13. A color difference computing part 22 computes color differences between the output color coordinate data and ideal color coordinate data. A color difference square mean computing part 23 computes a square mean of the color differences and regards the result as the error.

A coefficient optimization routine is performed by the color converting apparatus 21 specifically as follows: as mentioned above, the color converting apparatus 21 is designed to convert the print area ratios of C, M, Y and K into CIE L*a*b* (D50) color coordinates of printed results. In determining coefficients, the color converting apparatus 21 admits 928 sets of CMYK area ratios based on the IT8/7.3 Extended Set. Ideal output data are given in CIE L*a*b* color coordinates that are acquired by getting prints based on the area ratios and by having the printed results measured by colorimetry using a D50 light source. It is assumed that the input data x and the ideal output data y are in the relation of $$\{x_1, y_1\}, \{x_2, y_2\}, \ldots, \{x_i, y_i\}, \ldots, \{x_{928}, y_{928}\}$$

Each input data item $x_i$ in four dimensions is assumed to be $$x_i = (C_i, M_i, Y_i, K_i)$$

Each ideal output data item $y_i$ in three dimensions is assumed to be $$y_i = (L_i, a_i, b_i)$$

The k coefficients ($w_1, w_2, \ldots, w_p, \ldots, w_k$) of the data converting apparatus are all initialized to zero in advance. Given the data $x_i$, the data converting apparatus is assumed to output $$g(x_i | w_1, w_2, \ldots, w_p, \ldots, w_k)$$

At this point, the error with respect to the ideal output $y_i$ is defined as a $\Delta E$ color difference, i.e., a Euclidian distance in CIE L*a*b* color space $\Delta E$ ($y_i$, $g(x_i | w_1, w_2, \ldots, w_p, \ldots, w_k)$). With the second embodiment, the error of the color. converting apparatus is a square mean error of each of the colors as defined by the following expression (4):

$$E(w_1, w_2, \cdots, w_p, \cdots, w_k) = \sqrt{\sum_{i=1}^{928} \frac{\Delta E(y_i, g(x_i | w_1, w_2, \cdots, w_k))^2}{928}}$$

Of the k coefficients, the p-th coefficient $w_p$ is taken up here again for example. Three kinds of error are computed: an error $E_0$ about a current coefficient value, i.e., $E_0 = E(w_1, w_2, \ldots, w_p, \ldots, w_k)$; an error $E_+$ regarding a coefficient value greater than the current coefficient value by a predetermined step s1, i.e., $E_+ = E(w_1, w_2, \ldots, w_p + s_1, \ldots w_k)$; and an error $E_-$ with respect to a coefficient value smaller than the current coefficient value by the predetermined step s2, i.e., $E_- = E(w_1, w_2, \ldots, w_p - s_2, \ldots, w_k)$. With the second embodiment, the step s1 used as an increment to the current value is made different from the step s2 as a decrement to be subtracted therefrom. Alternatively, the two steps may have the same value.

One of the three errors above is selected by a suitable function whereby the smallest error is selected with the highest degree of probability. If the error $E_0$ is selected, the coefficient $w_p$ is not updated. If the error $E_-$ is selected, the coefficient $w_p$ is updated by incrementing it by the step s1. If the error $E_-$ is selected, the coefficient $w_p$ is updated by decrementing it by the step s2.

The operations above are applied to each weight $w_p$(p=1, 2, . . . , k). When the optimization routine made up of these operations has been performed once and come to an end, the color converting apparatus is checked for error. The optimization routine is repeated until the detected errors of the apparatus are either lowered below a predetermined level or are substantially converged. Alternatively, the routine is repeated a predetermined number of times. If a minimal error is reached, the corresponding coefficient is recorded as an optimal coefficient. In that case, the step s is augmented by having it multiplied by a value greater than 1. If the error is found to be greater than that in effect before the optimization routine is performed once and comes to an end, the steps s1 and s2 are decreased by having them multiplied by a suitable value smaller than 1 each. However, any value smaller than the step unit will not be taken.

When learning is completed following the above operations, the finally recorded optimal coefficient is output.

Third Embodiment

Below is a description of the third embodiment comprising a color converting apparatus which uses a table containing discrete coefficients and which resorts to interpolation. FIG. 4 shows a typical constitution of the third embodiment. In FIG. 4, those parts with their counterparts already shown in FIG. 1 are given the same reference numerals and detailed descriptions of such parts are omitted where they are repetitive. In FIG. 4, the input buffer 11 stores CIE L*a*b* (D50) color coordinate data as input data. Using a table containing discrete coefficients and by means of interpolation, a color converting apparatus 31 admits CIE L*a*b* (D50) color coordinates and computes area ratios of C, M, Y and K for an appropriate printer 32. For the third embodiment, data to be stored at lattice points are to be discrete values. The color converting apparatus 31 will be described later in more detail. The area ratios of C, M, Y and K are placed in the output buffer 13 and are used to drive the printer 32 to acquire print output. The print output is later measured so as to obtain CIE L*a*b* (D50) color coordinate data. The color coordinate data are placed in a measured value buffer 33. The ideal output data memory 14 stores the input data. Color differences between the input data and the color coordinate data in the measured value buffer 33 are computed by the color difference computing part 22. Given the color differences, a mean color difference computing part 34 computes a mean color difference which is regarded as the error.

A coefficient optimization routine is performed by the color converting apparatus 31 specifically as follows: representative points on each of an L* axis, an a* axis and a b* axis, e.g., 10 representative points on each, are arranged to constitute a three-dimensional table. In this table, converted area ratios of C, M, Y and K are recorded beforehand. At the time of color conversion, interpolation is applied to converted values at lattice points corresponding to the vertexes of the cube containing the input color coordinates, whereby converted results are obtained. There are known interpolation methods including tetrahedral interpolation, prismatic interpolation and cubic interpolation. Any one of such interpolation methods may be used with the third embodiment.

It should be noted that the converted values stored at the lattice points are generally obtained by rounding the converted values of the representative points in accordance with the accuracy of the table. Thus any interpolation method can produce errors during interpolation depending on how the input and output are dealt with.

The error of the color converting apparatus handling suitable coefficients is defined as a mean color difference obtained as follows: at sufficiently fine intervals, i.e., in increments of one-sixteenth of any two adjacent representative values at lattice points in each dimension, color conversion is carried out using the coefficients to compute the area ratios of C, M, Y and K. The computed results are used as the basis for printing. Color differences between colorimetric values of the print on the one hand and the color coordinates before conversion on the other hand are computed. A mean color difference over the entire input range is then calculated and regarded as the error. In that case, instead of having the actual print measured by colorimetry, a modeled printer may be used to predict values to be in effect after printing.

The third embodiment is intended to optimize the value at each of the lattice points so as to obtain a minimal mean color difference after interpolation. What follows is a description of how the optimization routine is performed by the third embodiment.

With respect to each of all lattice points (L, A, B), discrete coefficients {C(L, A, B), M(L, A, B), Y(L, A, B), K(L, A, B) } to be stored in the table are initialized using values rounded as per the precision of the table in question. The value T and the steps are suitably initialized. Within a color reproduction range, lattice points are serially numbered in ascending order starting from the lattice point of the lowest chroma. Outside the color reproduction range, lattice points are also numbered in ascending order starting from the lattice point of the smallest color difference before and after conversion. Thereafter, the processes below are carried out. Process (1): The lattice points are optimized for a value of K in the ascending order of their serial numbers by resorting to processes (1. 1) through (1. 3) below.

Process (1. 1): The current value of K is incremented by a predetermined step s to compute the error of the color converting apparatus.

Process (1. 2): The current value of K is decremented by the step s and by the step unit, whereby the error of the color converting apparatus is computed.

For the above computations, the color differences may be averaged within a specific range affected by the coefficients instead of within the entire input range. Illustratively, tetrahedral interpolation, prismatic interpolation and cubic interpolation may each deal with only the range covered by a tetrahedron, a prism or a cube having the lattice points as its vertexes.

Process (1. 3): The error from process (1. 1) and that from process (1.2) are each augmented by a random number of a uniform distribution within a given range of [0, T]. If the sum of the error from process (1. 1) and of the random number is found to be smaller than the sum of the error from process (1. 2) and of the random number, then the current value of K is updated by adding the step s to the value. Otherwise the current value of K is updated by subtracting the step s and the step unit from the value.

Process (2): The operations of process (1) above are applied to the value of K at all lattice points. After an optimization routine made up of these operations has been performed once and come to an end, the color converting apparatus is checked for error. The optimization routine is repeated until the detected errors of the apparatus are either lowered below a predetermined level or are substantially converged.

Alternatively, the routine is repeated a predetermined number of times. If a minimal error is reached, the corresponding coefficient is recorded as a coefficient for which K is optimized. In that case, the value T for determining the above-mentioned range is augmented by having T multiplied by a suitable value grater than 1. If the error is found to be greater than that in effect before the optimization routine is performed once and comes to an end, the value T is decreased by having T multiplied by a suitable value smaller than 1. Similar operations are performed on the step s, except that any value smaller than the step unit will not be taken.

The processes below are carried out after the coefficient for which K is optimized is set up as a new initial value, with the value T and step s suitably initialized as well.

Process (3): The lattice points are optimized for values of C, M and Y in the ascending order of the serial numbers of the points by resorting to processes (3. 1) through (3. 5) below.

Process (3. 1): The current value of C is incremented by the predetermined step s to compute the error of the color converting apparatus.

Process (3. 2): The current value of C is decremented by the step s and by the step unit, whereby the error of the color converting apparatus is computed.

Process (3. 3): The error from process (3. 1) and that from process (3. 2) are each augmented by a random number of a uniform distribution within a given range of [0, T]. If the sum of the error from process (3. 1) and of the random number is found to be smaller than the sum of the error from process (3. 2) and of the random number, then the current value of C is updated by adding the step s to the value. Otherwise the current value of C is updated by subtracting the step s and the step unit from the value.

Process (3. 4): Processes (3. 1) through (3. 3) are carried out with the value of C replaced by M.

Process (3. 5): Processes (3. 1) through (3. 3) are carried out with the value of C replaced by Y.

Process (4): The operations of process (3) above are applied to all lattice points. After an optimization routine made up of these operations has been performed once and come to an end, the color converting apparatus is checked for error. The optimization routine is repeated until the detected errors of the apparatus are either lowered below a predetermined level or are substantially converged. Alternatively, the routine is repeated a predetermined number of times. If a minimal error is reached, the corresponding coefficient is recorded as an optimal coefficient. In that case, the value T for determining the above-mentioned range is augmented by having T multiplied by a suitable value grater than 1. If the error is found to be greater than that in effect before the optimization routine is performed once and comes to an end, the value T is decreased by having T multiplied by a suitable value smaller than 1. Similar operations are performed on the step s, except that any value smaller than the step unit will not be taken.

When learning is completed following the above operations, the finally recorded optimal coefficient is output.

Fourth Embodiment

Described below is the fourth embodiment of the invention which optimizes coefficients by introducing a continuous function conceivable between discrete coefficient values on the one hand and errors on the other hand. FIG. 5 shows a typical constitution of the fourth embodiment. In FIG. 5, those parts with their counterparts already shown in FIG. 3 are given the same reference numerals and detailed descriptions of such parts are omitted where they are repetitive. In FIG. 5, a quadratic function determining part 41 determines a quadratic function based on the errors $E_0$, $E_-$ and $E_+$. A differential coefficient computing part 42 computes differential coefficients for $E_0$ in the quadratic function. A coefficient updating part 43 determines coefficients depending on the temperature (in annealing) and on the differential coefficient, as will be described later in more detail.

What follows is a detailed description of how the color converting apparatus 21 of the fourth embodiment optimizes coefficients. The color converting apparatus 21 may either perform its optimization routine alone in the fourth embodiment, or carry out the optimization routine a suitable number of times in the second embodiment before performing the routine in the fourth embodiment. The definitions of the errors and other aspects of the fourth embodiment are the same as those of the second embodiment.

Of the k coefficients, the p-th coefficient $w_p$ is taken up here again for example. Three kinds of error are computed: an error $E_0$ about a current coefficient value, i.e., $E_0 = E(w_1, w_2, \ldots, w_p, \ldots, w_k)$; an error $E_+$ regarding a coefficient value greater than the current coefficient value by a predetermined step $s_1$, i.e., $E_+ = E(w_1, w_2, \ldots, w_p + s_1, \ldots w_k)$; and an error $E_-$ with respect to a coefficient value smaller than the current coefficient value by the predetermined step $s_2$, i.e., $E_-=E(w_1, w_2, \ldots, w_p-s_2, \ldots, w_k)$. The three kinds of error are used as the basis for estimating the quadratic function whereby a differential coefficient $E'_p$ for $w_p$ is computed.

The coefficient $w_p$ is updated by the expression (5) below using a stochastic variable $X_+(E'_p; t)$ that is more likely to become 1 the greater the differential coefficient $E'_p$ (otherwise 0) as well as a stochastic variable $X_-(E'_p; t)$ more likely to become 1 the smaller the differential coefficient $E'_p$ (otherwise 0):

$$wp \leftarrow w_p + s_1 \cdot X_+(E'_p; t) - s_2 \cdot X_-(E'_p; t)$$

With the fourth embodiment, the step $s_1$ as an increment to the current coefficient value is made different from the step $s_2$ as a decrement to be subtracted therefrom. Alternatively, the step for addition to the current coefficient may be the same as the step for subtraction from that value.

The operations above are applied to each weight $w_p$ (p=1, 2, ..., k). When the optimization routine made up of these operations has been performed once and come to an end, the color converting apparatus is checked for error. The optimization routine is repeated until the detected errors of the apparatus are either lowered below a predetermined level or are substantially converged. Alternatively, the routine is repeated a predetermined number of times. If a minimal error is reached, the corresponding coefficient is recorded as an optimal coefficient. In that case, the steps $s_1$ and $s_2$ as well as the temperature t are each augmented through multiplication by a value greater than 1. If the error is found to be greater than that in effect before the optimization routine is performed once and comes to an end, the steps $s_1$ and s2 as well as the temperature t are each decreased through multiplication by a suitable value smaller than 1. However, any value smaller than the step unit will not be taken for the steps.

When learning is completed following the above operations, the finally recorded optimal coefficient is output.

With the fourth embodiment above, three points are taken up to compute differential coefficients using a quadratic function. Alternatively, with at least two points taken, a suitable function may be utilized to determine differential coefficients.

Instead of taking three kinds of error as described above, p coefficients can be computed by using appropriate p functions $f_1(w), f_2(w), \ldots, f_p(w)$.

For example, the following equations are possible:

$$f_1(w)=w+1$$
$$f_2(w)=w+2$$
$$f_3(w)=w+3$$
$$f_4(w)=w+4$$

wherein p=4. In the case of computing differential coefficients, it is possible to assume the differential coefficient of the current coefficient value not within a range including the current coefficient value; therefore the functional value may be the range not including the current coefficient.

For another example, the following equations are possible:

$$f_1(w)=\text{floor}(w*0.98)$$
$$f_2(w)=\text{floor}(w*0.99)$$
$$f_3(w)=w$$
$$f_4(w)=\text{ceil}(w/0.99)$$
$$f_5(w)=\text{ceil}(w/0.99)$$

wherein p=5. Here, floor means rounding by trimming, and ceil means rounding by raising to a unit. Trimming or raising to a unit is taken as an example of rounding operation for acquiring a discrete value possible for a coefficient, but any arbitrary method can be adopted as the rounding operation.

Applications

FIG. 6 sketches a typical structure of an electronic device utilizing a data converting apparatus of the invention. In FIG. 6, an electronic device 100 comprises a data converting apparatus 110. The data converting apparatus 110 has the same constitution as that described in conjunction with the preceding embodiments. For use as coefficients for conversion purposes, the data converting apparatus 110 takes discrete values. The data converting apparatus 110 gets a coefficient optimizing part 111 to perform optimization in the same manner as the preceding embodiments.

In this setup, a reference data converting apparatus may be used optionally to optimize coefficients beforehand. The optimized coefficients may then be installed in the data converting apparatus 110 of the electronic device 100, before being subjected to final optimization by the coefficient optimizing part 111.

FIG. 7 shows a typical structure of a color image forming apparatus (such as a color copier or a color printer) that utilizes a data converting apparatus of the invention. In FIG. 7, an image forming apparatus 200 has two color converting apparatuses 210 and 220 comprising a data converting apparatus each. Color data coming from an input part 230 are subject to successive color conversion by the color converting apparatuses 210 and 220. The converted color data are fed to an output part 240 for print output. In this example, one or both of the color converting apparatuses 210 and 220 may perform the coefficient optimization process that is carried out by the data converting apparatus of the invention.

FIG. 8 depicts a typical structure of a robot device utilizing a data converting apparatus of the invention. In FIG. 8, a robot 300 has a data converting apparatus 310. Depending on the position input from a position input part 320, the data converting apparatus 310 controls operations of the robot such as its attitude. An error detecting part 330 detects errors, whereby coefficients of the data converting apparatus are optimized.

As described, the data converting apparatus and coefficient determining apparatus according to the invention permit simplified and stabilized learning of coefficient values where data conversion is carried out using coefficients taking discrete values.

As many apparently different embodiments of this invention may be made without departing from the spirit and scope thereof, it is to be understood that the invention is not limited to the specific embodiments thereof except as defined in the appended claims.

What is claimed is:

1. In an image forming apparatus using an image input data group and an image output date group to produce an image and including a data converting apparatus that converts the image input data group into an image output data group in accordance with at least one conversion coefficient having a discrete conversion coefficient value, a conversion coefficient determining apparatus comprising:

computing apparatus that computes, for each conversion coefficient having a discrete value, an image output data group converted from the image input data group in accordance with at least two candidate conversion coefficient values from among:
  a current conversion coefficient value of the conversion coefficient,
  a candidate conversion coefficient value that is greater than a current conversion coefficient value of the conversion coefficient by a predetermined step s1, and
  a candidate conversion coefficient value that is smaller than the current conversion coefficient value of the conversion coefficient by a predetermined step s2; and
conversion coefficient value selecting apparatus that selects one of the at least two candidate conversion coefficient values as a new conversion coefficient value on the basis of errors between:
  the image output data group converted from the image input data group in accordance with one candidate conversion coefficient value, and
  an ideal image output data group corresponding to the image input data group.

2. A conversion coefficient determining apparatus according to claim 1, wherein said conversion coefficient value selecting apparatus includes selecting apparatus that adds random numbers of a predetermined distribution to errors, the selecting apparatus further selecting a candidate conversion coefficient value yielding a minimum sum of the addition of the error with the corresponding random number.

3. A conversion coefficient determining apparatus according to claim 1, wherein the conversion coefficient value selecting apparatus selects one of the at least two candidate conversion coefficient values as the new conversion coefficient value on the basis of a probability for each error, the probability being higher when the error is smaller, the conversion coefficient apparatus further comprising control apparatus that controls a degree of degression of the probability regarding a magnitude of the error, or the steps s1 and s2, or both the degree of degression and the steps s1 and s2, in accordance with a history of the error.

4. A conversion coefficient determining apparatus according to claim 3, wherein the control apparatus that controls the degree of degression of the probability regarding the magnitude of the error in accordance with the history of the error is implemented as apparatus that controls the predetermined distribution.

5. A conversion coefficient determining apparatus according to claim 1, wherein at least one conversion coefficient having a discrete value corresponds to outputs of representative points from a data converting apparatus which, at each of representative points in an m-dimensional representative point table corresponding to the image input data group, records beforehand discrete values corresponding to n outputs and which obtains n-dimensional outputs by interpolating the values corresponding to the outputs, the conversion coefficient determining apparatus further comprising conversion coefficient updating apparatus that updates conversion coefficients by defining errors and an ideal image output data group for the image input data group.

6. In an image forming apparatus using an image input data group and an image output data group to produce an image, a data converting apparatus comprising:
  data converting apparatus that converts the image input data group into an image output data group in accordance with at least one conversion coefficient having a discrete value;
  computing apparatus that computes, for each conversion coefficient having a discrete value, an image output data group converted from the image input data group in accordance with at least two candidate conversion coefficient values from among:
    a current conversion coefficient value of the coefficient,
    a candidate conversion coefficient value that is greater than a current conversion coefficient value of the conversion coefficient by a predetermined step s1, and
    a candidate conversion coefficient value that is smaller than the current conversion coefficient value of the conversion coefficient by a predetermined step s2; and
  conversion coefficient value selecting apparatus that selects one of the at least two candidate conversion coefficient values as a new conversion coefficient value on the basis of errors between:
    the image output data group converted from the image input data group in accordance with one candidate conversion coefficient value, and
    an ideal image output data group corresponding to the image input data group.

7. In an image forming apparatus using an image input color data group and an image output color data group to produce a color image, a color converting apparatus comprising:
  color converting apparatus that converts the image input color data group into image output color data group in accordance with at least one conversion coefficient having a discrete value;
  computing apparatus that computes, for each conversion coefficient having a discrete value, an image output color data group converted from the image input color data group in accordance with at least two candidate conversion coefficient values from among:
    a current conversion coefficient value of the conversion coefficient,
    a candidate conversion coefficient value that is greater than the current conversion coefficient value of the conversion coefficient by a predetermined step s1, and
    a candidate conversion coefficient value that is smaller than the current conversion coefficient value of the conversion coefficient by a predetermined step s2; and
  conversion coefficient value selecting apparatus that selects one of the at least two candidate conversion coefficient values as a new conversion coefficient value on the basis of errors between:
    the image output color data group converted from the image input color data group in accordance with one candidate conversion coefficient value, and
    an ideal image output color data group corresponding to the image input color data group.

8. A color converting apparatus according to claim 7, wherein the error is constituted by a color difference.

9. A color image forming apparatus comprising:
  receiving apparatus that receives an image input color data group;
  color converting apparatus that converts the image input color data group into an image output color data group in accordance with at least one conversion coefficient having a discrete value;
  output apparatus that performs a predetermined output operation based on the image output color data group coming from the color converting means;
  computing apparatus that computes for each of the at least one conversion coefficient having a discrete value, an image output color data group converted from an image input color data group in accordance with at least two candidate conversion coefficient values from among:
a current conversion coefficient value of the coefficient,
a candidate conversion coefficient value that is greater than the current conversion coefficient value of the conversion coefficient by a predetermined step s1, and
a candidate conversion coefficient value that is smaller than the current conversion coefficient value of the conversion coefficient by a predetermined step s2; and
conversion coefficient value selecting apparatus that selects one of the at least two candidate conversion coefficient values as a new conversion coefficient value on the basis of errors between:
the image output color data group computed in accordance with one candidate conversion coefficient value, and
an ideal image output color data group corresponding to the image input color data group,
color image forming apparatus that utilizes the color image output data to produce a color image.

10. A color image forming apparatus according to claim 9, wherein the output apparatus receives the image output color data group through color converting apparatus located downstream.

11. An electronic apparatus comprising:
image receiving apparatus that receives image input data group;
data converting apparatus that converts the image input data group into image output data group in accordance with at least one conversion coefficient having a discrete value;
output apparatus that performs a predetermined output operation based on the image output data group coming from the data converting means;
computing apparatus that computes, for each of the at least one conversion coefficient having a discrete value, an image output data group converted from the image input data group in accordance with at least two candidate conversion coefficient values from among:
a current conversion coefficient value of the conversion coefficient,
a candidate conversion coefficient value that is greater than the current conversion coefficient value of the conversion coefficient by a predetermined step s1, and
a candidate conversion coefficient value that is smaller than the current conversion coefficient value of the conversion coefficient by a predetermined step s2; and
conversion coefficient value selecting apparatus that selects one of the at least two candidate conversion coefficient values as a new conversion coefficient value on the basis of errors between:
the image output data group computed from the image input data group in accordance with one candidate conversion coefficient value, and
an ideal image output data group corresponding to the image input data group, and
image forming apparatus that utilizes the image output data to produce an image.

12. In an image forming apparatus using an image input data group and an image output data group to produce an image and including a data converting apparatus that converts the image input data group into an image output data group in accordance with at least one conversion coefficient having a discrete value, a conversion coefficient determining apparatus comprising:
image output data group computing apparatus that computes, for each of the at least one conversion coefficient having a discrete value, an image output data group in accordance with p candidate conversion coefficient values within a range including a current conversion coefficient value of the conversion coefficient;
error computing apparatus that acquires p errors by computing errors between:
the image output data group computed in accordance with one of the p candidate conversion coefficient values, and
an ideal image output data group corresponding to the image input data group;
differential conversion coefficient computing apparatus that assumes, on the basis of the p errors, a function of errors with respect to those of the current conversion coefficient values which may be differentiated, thereby computing differential conversion coefficients for the current conversion coefficient values; and
conversion coefficient updating apparatus that updates conversion coefficients either stochastically or definitely on the basis of the differential conversion coefficients.

13. A conversion coefficient determining apparatus according to claim 12, wherein the p candidate conversion coefficient values include at least one candidate conversion coefficient value from among:
a current conversion coefficient value of each conversion coefficient,
a conversion coefficient value greater than the current conversion coefficient value by a predetermined step s1, and
a conversion coefficient value smaller than the current conversion coefficient value by a predetermined step s2.

14. A conversion coefficient determining apparatus according to claim 12, further comprising control apparatus that controls a degree of degression of the function or errors regarding the magnitude of the errors, or the steps s1 and s2, or both the degree of degression and the steps s1 and s2, in accordance with a history of the errors.

15. A conversion coefficient determining apparatus according to claim 12, wherein the at least one conversion coefficient having a discrete value corresponds to outputs of representative points from a data converting apparatus which, at each of representative points in an m-dimensional representative point table corresponding to image input data group, records beforehand discrete values corresponding to n outputs and which obtains image output data groups by interpolating the values corresponding to the outputs, the conversion coefficient determining apparatus further comprising conversion coefficient updating apparatus that updates conversion coefficients by defining errors and the ideal image output data group for the image input data group.

16. In an image forming apparatus using an image input data group and an image output data group to produce an image, a data converting apparatus comprising:
data converting apparatus that converts the image input data group into an image output data group in accordance with at least one conversion coefficient having a discrete value;

image output data group computing apparatus that computes, for each of at the least one conversion coefficient having a discrete value, an image output data group in accordance with p candidate conversion coefficient values within a range including a current conversion coefficient value of the conversion coefficient;

error computing apparatus that acquires p errors by computing errors between:
- the image output data group computed in accordance with one of the p candidate conversion coefficient values, and
- an ideal image output data group corresponding to the image input data group;

differential conversion coefficient computing apparatus that assumes, on the basis of the p errors, a function of errors with respect to those of the current conversion coefficient values which may be differentiated, thereby computing differential conversion coefficients for the current conversion coefficient values; and conversion coefficient updating apparatus that updates conversion coefficients either stochastically or definitely on the basis of the differential conversion coefficients.

17. In an image forming apparatus using an image input color data group and an image output color data group to produce a color image, a color converting apparatus comprising:

color converting apparatus that converts the image input color data group into an image output color data group in accordance with at least one conversion coefficient having a discrete value;

image output color data group computing apparatus that computes, for each of the at least one conversion coefficient having a discrete value, an image output color data group in accordance with p candidate conversion coefficient values within a range including a current conversion coefficient value of the conversion coefficient;

error computing apparatus that acquires p errors by computing errors between:
- the image output color data group computed in accordance with one of the p candidate conversion coefficient values, and
- an ideal image output color data group corresponding to an image input color data group;

differential conversion coefficient computing apparatus that assumes, on the basis of the p errors, a function of errors with respect to those of the current conversion coefficient values which may be differentiated, thereby computing differential conversion coefficients for the current conversion coefficient values; and conversion coefficient updating apparatus that updates conversion coefficients either stochastically or definitely on the basis of the differential conversion coefficients.

18. A color converting apparatus according to claim 17, wherein the errors are constituted by color differences.

19. A color image forming apparatus comprising:

receiving apparatus that receives image input color group data;

color converting apparatus that converts the image input color data group into image output color data group in accordance with at least one conversion coefficient having a discrete value;

output apparatus that performs a predetermined output operation based on the image output color data group coming from the color converting means;

image output color data group computing apparatus that computes, for each of the at least one conversion coefficient having a discrete value, an image output color data group in accordance with p candidate conversion coefficient values within a range including a current conversion coefficient value of the conversion coefficient;

error computing apparatus that acquires p errors by computing errors between:
- the image output color data group computed in accordance with one of the p candidate conversion coefficient values, and
- an ideal image output color data group corresponding to an image input color data group;

differential conversion coefficient computing apparatus that assumes, on the basis of the p errors, a function of errors with respect to those of the current conversion coefficient values which may be differentiated, thereby computing differential conversion coefficients for the current conversion coefficient values; and conversion coefficient updating apparatus that updates conversion coefficients either stochastically or definitely on the basis of the differential conversion coefficients, and image forming apparatus that utilizes the image output data to produce an image.

20. A color image forming apparatus according to claim 19, wherein the output apparatus receives the image output color data group through color converting means located downstream.

21. An electronic apparatus comprising:

receiving apparatus that receives an image input color data group;

data converting apparatus that converts the image input data group into an image output data group in accordance with at least one conversion coefficient having a discrete value;

output apparatus that performs a predetermined output operation based on the image output data group coming from the data converting means;

image output data group computing apparatus that computes, for each of the at least one conversion coefficient having a discrete value, an image output data group in accordance with p candidate conversion coefficient values within a range including a current conversion coefficient value of the conversion coefficient;

error computing apparatus that acquires p errors by computing errors between:
the image output data group computed in accordance with one of the p candidate conversion coefficient values, and an ideal image output data group corresponding to the image input data group;

differential conversion coefficient computing apparatus that assumes, on the basis of the p errors, a function of errors with respect to those of the current conversion coefficient values which may be differentiated, thereby computing differential conversion coefficients for the current conversion coefficient values; and conversion coefficient updating apparatus that updates conversion coefficients either stochastically or definitely on the basis of the differential conversion coefficients, and image forming apparatus that utilizes the image output data to produce an image.

22. In an image forming apparatus using an image input data group a conversion coefficient determining apparatus including a neural network having at least one conversion coefficient having a discrete incidence number, or a discrete threshold value, or both a discrete incidence number and a discrete threshold value, the conversion coefficient determining apparatus comprising:

computing apparatus that computes, for each of the at least one conversion coefficient having a discrete value, an image output data group with respect to an image input data group in accordance with at least two candidate conversion coefficient values from among:
  a current conversion coefficient value of the conversion coefficient,
  a conversion coefficient value greater than the current conversion coefficient value by a predetermined step s1, and
  a conversion coefficient value smaller than the current conversion coefficient value by a predetermined step s2; and
conversion coefficient value selecting apparatus that selects one of the at least two candidate conversion coefficient values as a new conversion coefficient value on the basis of errors between:
  the image output data group computed in accordance with one of the at least two candidate conversion coefficient values, and
  an ideal image output data group corresponding to the image input data group, and
image forming apparatus that utilizes the image output data to produce an image.

23. In an image forming apparatus using an image input data group and an image output data group to produce an image a data converting apparatus comprising:

a neural network having at least one conversion coefficient having a discrete incidence number, or a discrete threshold value, or both a discrete incidence number and a discrete threshold value;
computing apparatus that computes, for each of the at least one conversion coefficient having a discrete value, an image output data group with respect to an image input data group in accordance with at least two candidate conversion coefficient values from among:
  a current conversion coefficient value of the conversion coefficient,
  a conversion coefficient value greater than the current conversion coefficient value by a predetermined step s1, and
  a conversion coefficient value smaller than the current conversion coefficient value by a predetermined step s2; and
conversion coefficient value selecting apparatus that selects one of the at least two candidate conversion coefficient values as a new conversion coefficient value on the basis of errors between:
  the image output data group computed in accordance with one candidate conversion coefficient value, and
  an ideal image output data group corresponding to the image input data group.

24. In an image forming apparatus using an image input data group and an image output data group to produce an image, a conversion coefficient determining apparatus comprising a neural network having at least one conversion coefficient having a discrete incidence number, or a discrete threshold value, or both a discrete incidence number and a discrete threshold value, the conversion coefficient determining apparatus comprising;

image output data group computing apparatus that computes, for each of the at least one conversion coefficient having a discrete value, an image output data group in accordance with p candidate conversion coefficient values within a range including a current conversion coefficient value of the conversion coefficient;
error computing apparatus that acquires p errors by computing errors between:
  the image output data group computed in accordance with one of the p candidate conversion coefficient values, and
  an ideal image output data group corresponding to the image input data group;
differential conversion coefficient computing apparatus that assumes, on the basis of the p errors, a function of errors with respect to those of the current conversion coefficient values which may be differentiated, thereby computing differential conversion coefficients for the current conversion coefficient values; and
conversion coefficient updating apparatus that updates conversion coefficients either stochastically or definitely on the basis of the differential conversion coefficients.

25. In an image forming apparatus using an image input data group and an image output data group to produce an image, a conversion coefficient determining apparatus and a data converting apparatus for use with a neural network of an image forming apparatus, each of the conversion coefficient determining apparatus and the data converting apparatus comprising:

a neural network having at least one conversion coefficient having a discrete incidence number, or a discrete threshold value, or both a discrete incidence number and a discrete threshold value;
image output data group computing apparatus that computes, for each of the at least one conversion coefficient having a discrete value, an image output data group in accordance with p candidate conversion coefficient values within a range including a current conversion coefficient value of the conversion coefficient;
error computing apparatus that acquires p errors by computing errors between:
  the image output data group computed in accordance with one of the p candidate conversion coefficient values, and
  an ideal image output data group corresponding to the image input data group;
differential conversion coefficient computing apparatus that assumes, on the basis of the p errors, a function of errors with respect to those of the current conversion coefficient values which may be differentiated, thereby computing differential conversion coefficients for the current conversion coefficient values; and
conversion coefficient updating apparatus that updates conversion coefficients either stochastically or definitely on the basis of the differential conversion coefficients.

26. In an image forming apparatus using an image input data group and an image output data group to produce an image a conversion coefficient determining apparatus comprising a data converting apparatus that converts the image input data group into an image output data group in accordance with at least one conversion coefficient having a discrete value, the conversion coefficient determining apparatus comprising:

computing apparatus that computes, for each of the at least one conversion coefficient having a discrete value, an image output data group with respect to the image input data group in accordance with at least two candidate conversion coefficient values from among:
        a current conversion coefficient value of the coefficient,
        a conversion coefficient value greater than the current conversion coefficient value by a predetermined step s1, and
        a conversion coefficient value smaller than the current conversion coefficient value by a predetermined step s2;
    conversion coefficient value selecting apparatus that selects one of the at least two candidate conversion coefficient values as a new conversion coefficient value on the basis of errors between:
        the image output data group computed in accordance with one of the two candidate conversion coefficient values, and an ideal image output data group corresponding to the image input data group;
    image output data group computing apparatus that computes, for each of the at least one conversion coefficient having a discrete value, an image output data group in accordance with p candidate conversion coefficient values within a range including a current conversion coefficient value of the conversion coefficient;
    error computing apparatus that acquires p errors by computing errors between:
        the image output data group computed in accordance with one of the p candidate conversion coefficient values, and
        an ideal image output data group corresponding to the image input data group;
    differential conversion coefficient computing apparatus that assumes, on the basis of the p errors, a function of errors with respect to those of the current conversion coefficient values which may be differentiated, thereby computing differential conversion coefficients for the current conversion coefficient values; and
    conversion coefficient updating apparatus that updates conversion coefficients either stochastically or definitely on the basis of the differential conversion coefficients;
    wherein the conversion coefficient value selecting means performs selection of the new conversion coefficient value at least once and then the conversion coefficient updating means carries out updating of conversion coefficients at least once.

27. In a method of using an image input data group and an image output data group to produce an image, a conversion coefficient determining method for converting an image input data group into the image output data group in accordance with at least one conversion coefficient having a discrete value, the conversion coefficient determining method comprising:

computing, for each of the at least one conversion coefficient having a discrete value, an image output data group with respect to the image input data group in accordance with at least two candidate conversion coefficient values from among:
        a current conversion coefficient value of the coefficient,
        a conversion coefficient value greater than the current conversion coefficient value by a predetermined step s1, and
        a conversion coefficient value smaller than the current conversion coefficient value by a predetermined step s2; and
    selecting one of the at least two candidate conversion coefficient values as a new conversion coefficient value on the basis of errors between:
        the image output data group computed in accordance with one of the at least two candidate conversion coefficient values, and
        an ideal image output data group corresponding to the image input data group.

28. In a method of using an image input data group and an image output data group to produce an image, a conversion coefficient determining method for converting an image input data group into the image output data group in accordance with at least one conversion coefficient having a discrete value, the conversion coefficient determining method comprising:

computing, for each of the at least one conversion coefficient having a discrete value, an image output data group in accordance with p candidate conversion coefficient values within a range including a current conversion coefficient value of the conversion coefficient;
    acquiring p errors by computing errors between:
        the image output data group computed in accordance with one of the p candidate conversion coefficient values, and
        an ideal image output data group corresponding to the image input data group;
    using on the basis of the p errors, a function of errors with respect to those of the current conversion coefficient values which may be differentiated;
    computing differential conversion coefficients for the current conversion coefficient values based on the function of errors; and
    updating conversion coefficients either stochastically or definitely on the basis of the differential conversion coefficients.

29. In a method of using an image input data group and an image output date group to produce an image a conversion coefficient determining method for converting the image input data group into the image output data group in accordance with at least one conversion coefficient having a discrete value, the method comprising:

computing, for each of the at least one conversion coefficient having a discrete value, the image output data group with respect to the image input data group in accordance with at least two candidate conversion coefficient values from among:
        a current coefficient value of the conversion coefficient,
        a conversion coefficient value that is greater than the current conversion coefficient value by a predetermined step s1, and
        a conversion coefficient value that is smaller than the current conversion coefficient value by a predetermined step s2;
    selecting one of the at least two candidate conversion coefficient values as a new conversion coefficient value on the basis of errors between:
        the image output data group computed in accordance with one of the at least two candidate conversion coefficient values, and
        an ideal image output data group corresponding to the image input data group;

computing, for each of the at least one conversion coefficient having a discrete value following the selection of the new conversion coefficient value, the image output data group in accordance with p candidate conversion coefficient values within a range including a current conversion coefficient value of the conversion coefficient;

acquiring p errors by computing errors between:
the image output data group computed in accordance with one of the p candidate conversion coefficient values, and
an ideal image output data group corresponding to the image input data group;

using on the basis of the p errors, a function of errors with respect to those of the current conversion coefficient values based on the determined function of errors which may be differentiated;

computing differential conversion coefficients for the current conversion coefficient values; and updating conversion coefficients either stochastically or definitely on the basis of the differential conversion coefficients;

wherein the selection of the new conversion coefficient value is performed at least once and the updating of conversion coefficients is carried out at least once.

30. In a method of using an image input data group and an image output data group to produce an image, a method for converting the image input data group into an image output data group in accordance with at least one conversion coefficient having a discrete value, the method comprising:

causing a computation, for each of the at least one conversion coefficient having a discrete value, of an image output data group with respect to the image input data group in accordance with at least two candidate conversion coefficient values from among:
a current conversion coefficient value of the coefficient,
a conversion coefficient value that is greater than the current conversion coefficient value by a predetermined step s1, and
a conversion coefficient value that is smaller than the current conversion coefficient value by a predetermined step s2;

selecting one of the at least two candidate conversion coefficient values as a new conversion coefficient value on the basis of errors between:
the image output data group computed in accordance with one of the at least two candidate conversion coefficient values, and
the ideal image output data group corresponding to the image input data group; and setting the selected candidate conversion coefficient value as a conversion coefficient for use by the data converting apparatus.

31. In a method of using an image input data group and an image output data group to produce an image, a method for converting an image input data group into an image output data group in accordance with at least one conversion coefficient having a discrete value, the method comprising:

causing a computation, for each of the at least one conversion coefficient having a discrete value, of an image output data group in accordance with p candidate conversion coefficient values within a range including a current conversion coefficient value of the conversion coefficient;

acquiring p errors by computing errors between:
the image output data group computed in accordance with one of the p candidate conversion coefficient values, and
the ideal image output data group corresponding to the image input data group;

using, on the basis of the p errors, a function of errors with respect to those of the current conversion coefficient values which may be differentiated;

computing differential conversion coefficients for the current conversion coefficient values based on the determined function of errors;

updating conversion coefficients either stochastically or definitely on the basis of the differential conversion coefficients; and setting the selected candidate conversion coefficient value as a conversion coefficient for use by the data converting apparatus.

32. In an image forming apparatus using an image input data group and an image output data group to produce an image and including a data converting apparatus that converts the image input data group into an image output data group in accordance with at least one conversion coefficient having a discrete value, a conversion coefficient determining apparatus comprising:

conversion coefficient computing apparatus that computes p candidate conversion coefficient values in accordance with at least more than one conversion coefficient having a discrete value, by way of performing p kinds of predetermined functional operations to compute p kinds of conversion coefficient values;

image output data group computing apparatus that computes image output data group corresponding to the image input data in accordance with p kinds of conversion coefficient values being given by the conversion coefficient computing means;

error computing apparatus that acquires p kinds of errors from the image output data group and an ideal image output data group corresponding to the image input data group;

differential conversion coefficient computing apparatus that computes the current differential conversion coefficient with respect to those of the current conversion coefficient values, on the basis of the errors, and that assumes a predetermined differential function of errors from the conversion coefficient values; and conversion coefficient updating apparatus that updates conversion coefficients either stochastically or definitely on the basis of the differential conversion coefficients.

33. In an image forming apparatus using an image input data group and an image output data group to produce an image and including a data converting apparatus that converts the image input data group into an image output data group in accordance with at least one conversion coefficient having a discrete value, a conversion coefficient determining apparatus comprising:

conversion coefficient computing apparatus that computes p candidate conversion coefficient values in accordance with at least more than one conversion coefficient having a discrete value, by way of performing p kinds of predetermined functional operations to compute p kinds of conversion coefficient values;

output data group computing apparatus that computes the image output data group corresponding to the image input data group in accordance with the p kinds of conversion coefficient values being given by the conversion coefficient computing means;

error computing means that acquires p kinds of errors from the image output data group and an ideal image output data group corresponding to the image input data group;

differential conversion coefficient computing apparatus that computes the current differential conversion coefficient with respect to those of the current conversion coefficient values, on the basis of the errors, and that assumes a predetermined differential function of errors from the conversion coefficient values.

34. A conversion coefficient determining apparatus according to claim 32, further comprising:

controlling apparatus controlling, according to a history of the errors, a ratio of p to a magnitude of the differential conversion coefficient and the p kinds of predetermined functional operations.

35. A conversion coefficient determining apparatus according to claim 32, wherein the predetermined function of the predetermined functional operations adds a suitable discrete value to the current conversion coefficient values.

36. A conversion coefficient determining apparatus according to claim 32, wherein the predetermined function of the predetermined functional operations multiplies suitable discrete value to the current conversion coefficient values.

37. A conversion coefficient determining apparatus according to claim 32, wherein the predetermined function of the predetermined functional operations divides the current conversion coefficient values by a suitable discrete value.

* * * * *